Dec. 22, 1942.                R. RAMSEY                    2,305,993
           MACHINE FOR USE IN TEACHING READING, NUMBERS, AND ART
                    Filed March 19, 1941        3 Sheets-Sheet 1
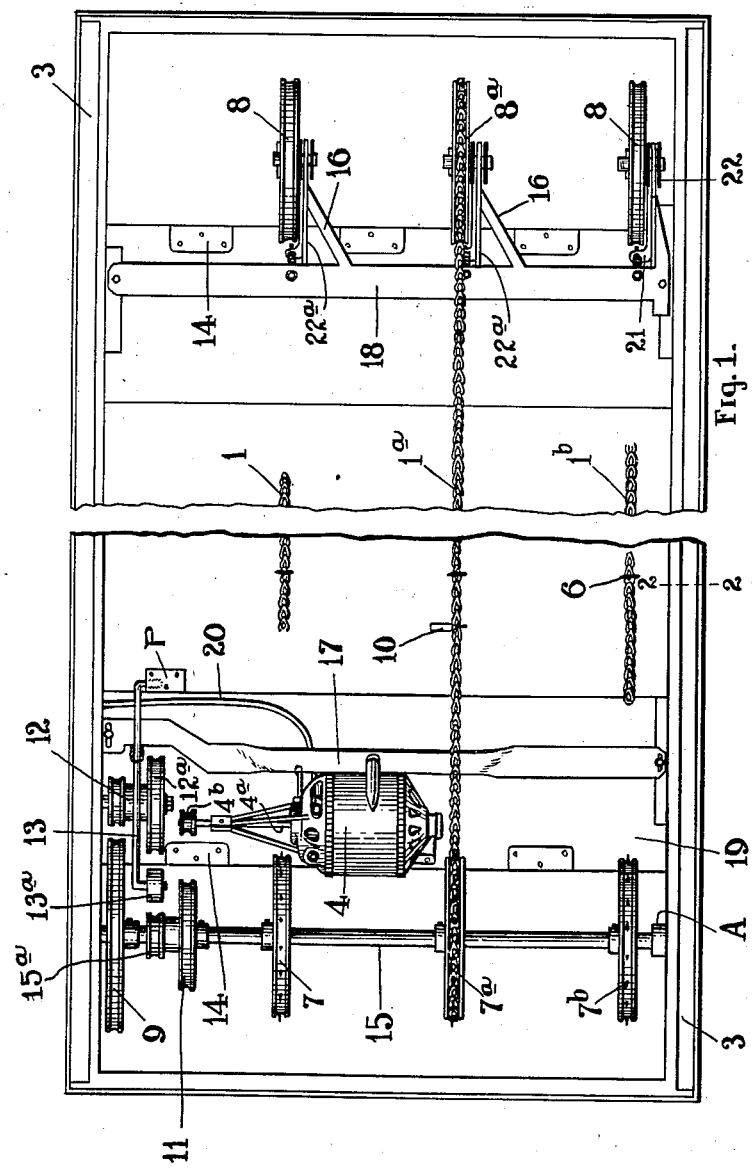
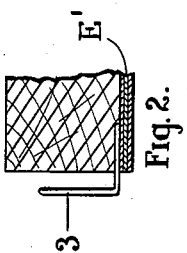
INVENTOR.
Mrs. Ruth Ramsey Dec. 22, 1942.   R. RAMSEY   2,305,993
MACHINE FOR USE IN TEACHING READING, NUMBERS, AND ART
Filed March 19, 1941   3 Sheets-Sheet 2

INVENTOR.
Mrs. Ruth Ramsey

Dec. 22, 1942.　　　　　R. RAMSEY　　　　　2,305,993
MACHINE FOR USE IN TEACHING READING, NUMBERS, AND ART
Filed March 19, 1941　　　3 Sheets-Sheet 3

INVENTOR.
Mrs. Ruth Ramsey

Patented Dec. 22, 1942

2,305,993

UNITED STATES PATENT OFFICE 2,305,993

MACHINE FOR USE IN TEACHING READING, NUMBERS, AND ART

Ruth Ramsey, Honey Grove, Tex.

Application March 19, 1941, Serial No. 384,146

10 Claims. (Cl. 35—35)

This invention relates to educational devices of a type adapted to use in teaching reading, numbers and art.

One of the objects of the invention is to provide a device of this character having a combination of instrumentalities for exposing in slow or rapid display single words, phrases, sentence and figures. The construction and operation of the device are designed to train a child's vision in steady, rhythmical movement of the eye along a line of numerical characters and/or words, phrases, or the like.

Another object of the invention is the provision of a device of this character which may also be utilized to display in slow or rapid movement, figures of any desired object made of cardboard or figures of three dimensions or solid in form. The invention in this respect is to display in theatre stage form so as to act out stories and nursery rhymes for children, and also as an aid in teaching pictorial art.

Other objects and advantages of the invention may be readily understood from a perusal of the following detailed description, taken in connection with the accompanying drawings, and in the drawings:

Figure 1 is a rear elevational view of the invention, in broken formation, slidable back removed, and parts broken away;

Figure 2 is a detail sectional view had on the line 2—2, Figure 1;

Figure 3:
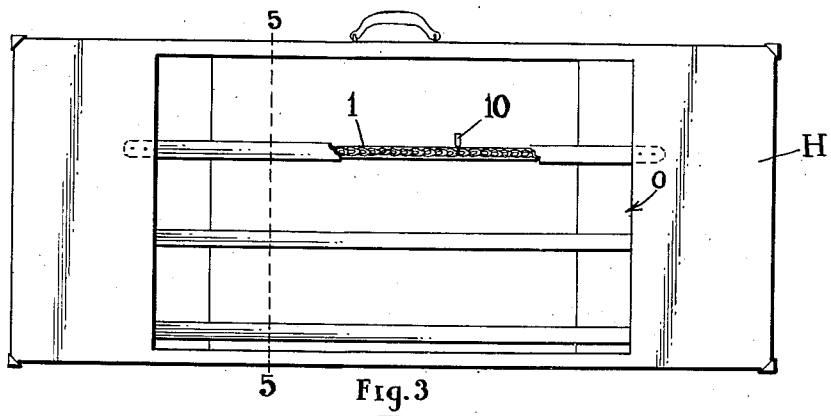
Figure 3 is a front elevational view of the invention on a reduced scale, showing stage opening, and partly broken away.
Figure 9:
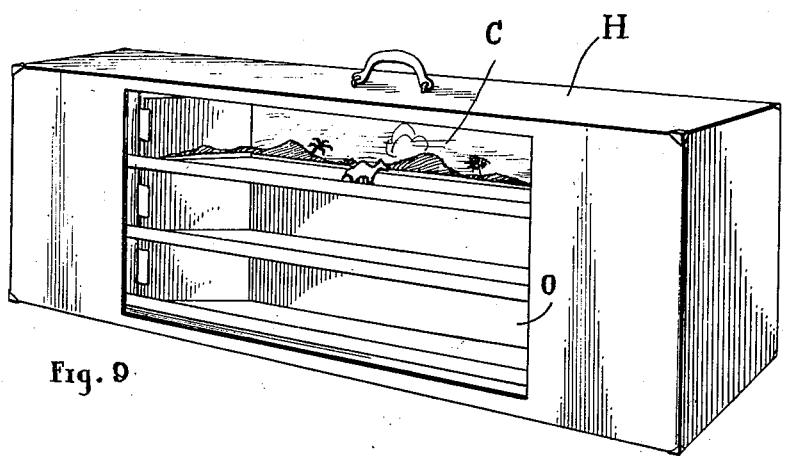
Figure 9 is a front perspective view of the invention, showing the three theatre stages.

In accordance with the drawings, the device is enclosed in a housing H, made of any suitable material. The front of the housing, as shown in Figures 3 and 9, has an opening O. The back of the housing has two openings, normally closed by the doors D, the back being in two parts E—1 and E—2. The back may be removed separately when required to operate the machine when the front opening O or theatre is being used. Strips 3 are provided to hold the parts E—1 and E—2 in position and which parts may thus be slid from such position when desired. When the device is to be used as a theatre it occupies the position shown in Figure 9, and when used to display numerals in teaching mathematics, or for words or phrases, the housing is set on the end supporting the motor 4.

Disposed in one end of the housing is a support 17 for a motor 4 and adjacent the motor is a shaft 15 having its ends journaled in bearings such as A. Mounted on the shaft 15 at suitably spaced intervals are three sprocket wheels 7—a, 7—b and 7. The shaft 15 also has mounted thereon a pulley 11, which is free of the shaft 15, and is formed integrally with a pulley 15—a. A drive pulley 9 is mounted on one end of the shaft 15. The motor 4, through its shaft 4—a and pulley 4—b, supplies motive power for driving the pulley 9. Included in the drive assembly are pulleys 12 and 12—a, and drive belts (not shown) impart power from the motor shaft pulley 4—b to the pulley 11, from pulley 15—a to the pulley 12—a, thence from pulley 12 to the pulley 9, thereby causing a rotation of the shaft 15. A shaft 13 of small diameter or rod, carrying a roller 13—a and operated by a foot pedal P, maintains the belt between pulleys 15—a and 12—a in a tautened condition.

Figure 6:
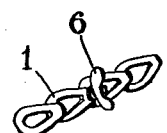
Figure 6 is a fragmentary detail view of one of the traveling chains, showing fastening means for cards or panels illustrated in Figure 7.
Figure 7:
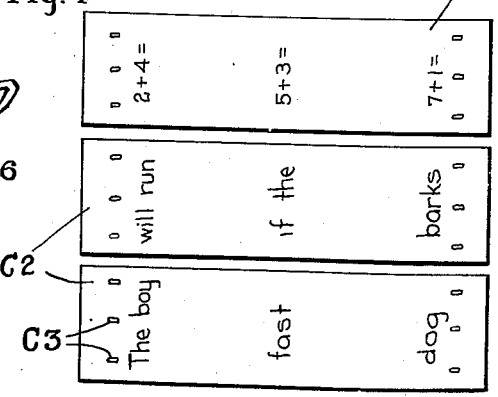
Figure 7 is a top plan view of a plurality of cards or panels for removable attachment to the traveling chains.
Figure 8:
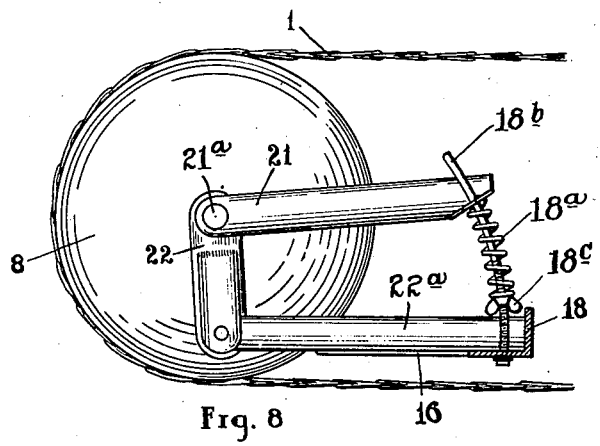
Figure 8 is an enlarged detail view of one of the pulley wheels, per se, showing a portion of a traveling chain and chain tensioning means.

In the opposite end of the housing is a support 18 and on which are mounted three pulley wheels 8, 8—a and 8—b. These pulley wheels in connection with the sprocket wheels 7, 7—a and 7—b, form a means for supporting the chains 1, 1—a and 1—b (shown in broken away form) constitute a plurality of traveling supports for carrying the cards and characteristic figures, more particularly referring to hereinafter. In Figure 8 is shown one of the pulley wheels and its rigging. Each wheel is rotatably supported on a pin 21—a, held in place by the members 21 and 22 which are welded together to provide a rigid connection. The member 22 is pivoted to a member 22—a, the latter being connected to the support 18. A brace is shown at 16. In order to maintain a correct tension on the chains 1, 1—a and 1—b, a spring 18—a is mounted on a rod 18—b, secured to the support 18, and a wing nut 18—c provides a means for adjusting the spring to desired tension. The motor is supplied with electrical power through a cord 20 and supports 14 are provided for holding in display position backgrounds of paper or cardboard, such as shown at C. Stems 10 and buttons 6, shown in detail in Figures 10 and 6, serve to retain the characteristic figures and cards or panels in position on the chains 1, 1—a and 1—b. In Figure 7 are shown a plurality of the cards on which are shown words, phrases and numerals, these cards being used when the device is set on end and the indicia displayed through the openings normally closed by the doors D. The cards C—1 carry the numerals and the cards C—2 have words and phrases or sentences shown thereon.

Figures 10, 11:
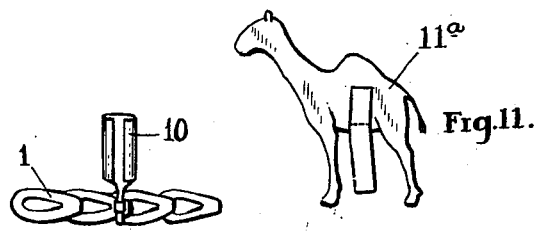
Figure 10 is a fragmentary detail view of one of the traveling chains, showing supporting means for characteristic figures.
Figure 11 is a side elevational view of one of the figure characters.

In the operation of the device, which is termed a "motorscope" and when utilized as a "theatre" as shown in Figure 9, the characteristic figures (one of which is shown in Figure 11) are inserted in the stems 10. These figures then revolve or travel around and cross the stage. When the chains 1 are at the proper tension, the vibrations of the chains cause the figures to appear to be moving in a characteristic attitude or walking motion, against the backgrounds C.

Figure 4:
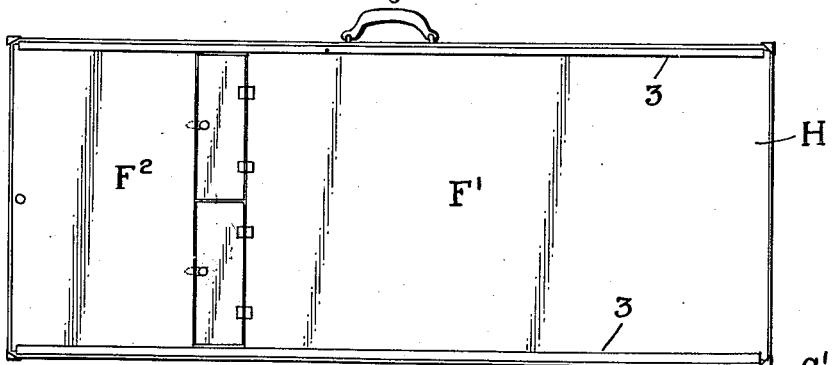
Figure 4 is a rear elevational view, on a reduced scale, with the slidable back in closed position.
Figure 5:
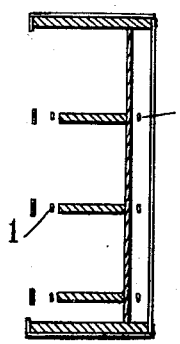
Figure 5 is a cross-sectional view, had on the line 5—5, Figure 3.

When the motorscope is used for reading or for mathematics, the cards shown in Figure 7 are fastened to the chains by means of the wing nut or "button" 6. The button may be turned so that the apertures or holes C—3 in the cards may be fitted over them. The buttons are arranged so that the cards will make a complete circle around the chains without any gaps. The small doors D in Figure 4 may be opened outwardly so that only one line of cards may be seen at a time. Both doors are opened when the phrase or sentence cards are used. This teaches quick thinking in mathematics and word recognition. The front of the motorscope consists of three small stages upon which the characters in stories move and act. The character comes on the first stage at the left and moves at any speed the operator of the device desires across the stage and leaves the stage on the right at the instant the character on the second stage enters. The speed of travel of the chains carrying the various characteristic figures is controlled by the foot pedal P, previously explained. The second character crosses the stage and leaves the same at the right at the instant the third character comes on the third stage at the left. In the meantime the operator changes the figures or characters on the first and second chains from the rear of the housing H which as explained heretofore may be slid out of the way for this purpose. The show thus continues without interruption. The exact timing of the entrance of the figures or characters trains the eye of the observer in the backward sweep from the line read to the beginning of the following line, and the eye following the character across the stage is trained in rhythmical movement across the line without regressions. This is useful in preparing the child for reading, especially the foreign child. Most nursery rhymes and stories for children can be shown on the motorscope in perfect continuity.

The motorscope holds two lines of cards, with four cards in each line or "string," and each card has three exposures. This makes twelve exposures for each line or "string" of cards, constituting twenty-four exposures (or words, etc.) when the machine is loaded for a word drill, or twenty-four different number combinations. The machine carries four sentence cards and each of these cards has three sentences which comprises a story of twelve sentences. In placing the cards on the chains the ends of the cards are overlapped for the purpose of preventing the cards from dragging or contacting the housing walls.

It is intended that the device be operated by the person telling the story, who may be the child changing the figures from the rear of the machine, or by a child in front of the machine, operating the foot pedal control, because in this way the operator can regulate the speed of travel of the characters to conform to the interpretation of the story.

From the foregoing it will be evident that the device presents a practical means for rapid flashing of sentences and in increasing the eye span and affords an interesting word drill. It also provides activities for the primary child in reading, pictorial art, and number work and trains the eye movement along the line from left to right without regression, with a quick backward sweep the beginning of the following line, promotes speed and accuracy in recognition of words and number combinations, and saves time and work for the primary teacher, by enabling the child to work independently and well.

While the disclosure presents a practical means for bringing about the objects set forth, it is to be understood that the invention is capable of modifications and alterations, in keeping with the inventive thought involved, and which would be within the scope and meaning of the claims appended hereto.

What is claimed is:

1. An educational device of the nature described, comprising a housing of rectangular form with openings at the front and rear thereof, a plurality of pulleys, chains and a motor to provide traveling supports, the supports carrying removable cards with words, phrases, sentences and numerals thereon, the openings at the rear having two doors whereby a word or numerals may be exposed by opening one door and a sentence shown when opening both doors, the said rear openings being positioned to expose the reading matter horizontally with respect to the housing and in reading position when the housing is set on one end.

2. An educational device of the nature described, comprising a housing of rectangular shape with openings at the front and at the rear thereof, a plurality of pulleys, chains and a motor to provide traveling supports, the supports carrying removable cards with words, phrases, sentences and numerals thereon, the traveling supports also adapted to carry suitable toy figures mounted in spaced form thereon and to be exposed at the front opening of said housing when the rear openings are not being used, the front opening being divided into three areas whereby three rows of said toy figures may be exposed successively, the housing being seated or supported on one side when the device is utilized to expose the toy figures.

3. An educational device as claimed in claim 1, the rear of the housing with the doors being in two parts slidably arranged by suitable strips for removal when desired.

4. An educational device as claimed in claim 1 which includes a variable resistor operated by a foot pedal to vary the speed of the motor for required speeds of the traveling supports.

5. A display cabinet of the character described, comprising an elongated housing comprising front and rear walls each having an opening therein, one of which is adapted to serve as a display opening while the other serves to permit an operator to change the display, an endless carrier within said housing adapted to present successive removable display objects to said front and rear openings, an opaque vertical longitudinal partition parallel to the front and rear walls serving as a background for the display opening, and motor means for actuating said endless carrier.

6. A display cabinet of the character described, comprising an elongated housing having front and rear openings, one of which may be used for display purposes while the other is used by an operator for changing the display, a plurality of spaced endless display carriers adapted to present successive objects to the display opening, a plurality of horizontally disposed longitudinal partitions dividing the display opening into separate stages corresponding in number to the number of carriers, and an opaque vertically disposed longitudinal partition separating the front and rear openings and serving as a background for the separate stages.

7. A display cabinet of the character described, comprising an elongated housing of substantially suit-box form adapted to rest upon a narrow elongated bottom wall and having relatively broad front and rear walls, an opening in the front wall providing a display opening, horizontal partitions dividing the display opening into a plurality of stages, a plurality of endless carriers, corresponding in number to the number of stages, adapted to present successive removable objects to the various stages, an opening in the rear wall to permit an operator to change the objects on said carriers as they pass the rear opening, and an opaque vertical partition separating the front and rear openings and serving as a background for the display opening.

8. A cabinet adapted for the display of successive changeable objects against a background, and adapted to permit adjustment of said objects, comprising an elongated housing having front and rear openings therein, one of which openings is adapted to serve for the display of removable objects while the other serves to permit an operator to adjust said objects, an endless carrier within said housing adapted to present successive removable display objects to said front and rear openings, and a vertical longitudinal opaque partition parallel to the front and rear walls serving as a background for the display opening and also serving to separate the front and rear openings.

9. A display device as set forth in claim 8, including a plurality of horizontal partitions dividing the display opening into a plurality of stages, and a plurality of endless carriers corresponding in number to the number of stages.

10. In a display cabinet of the character described, comprising a housing having a display opening therein, an endless carrier within said housing adapted to present a series of removable objects to said opening, said carrier comprising a chain having a plurality of socket members secured thereto at spaced intervals, each socket member being adapted to receive a correspondingly shaped projection carried by one of the removable objects to be displayed.

RUTH RAMSEY.